US 9,249,037 B2

(12) United States Patent
Mansour et al.

(10) Patent No.: US 9,249,037 B2
(45) Date of Patent: Feb. 2, 2016

(54) METHOD FOR CONTINUOUS TREATMENT OF WATER CONTAINING ORGANIC MATTER BY ENZYME TREATMENT

(71) Applicant: Veolia Water Solutions & Technologies Support, Saint-Maurice (FR)

(72) Inventors: Alicia Mansour, Mantes-la-Jolie (FR); Thierry Arnaud, Le Thor (FR)

(73) Assignee: Veolia Water Solutions & Technologies Support, Saint-Maurice (FR)

( * ) Notice: Subject to any disclaimer, the term of this patent is extended or adjusted under 35 U.S.C. 154(b) by 49 days.

(21) Appl. No.: 14/048,683

(22) Filed: Oct. 8, 2013

(65) Prior Publication Data

US 2014/0102976 A1   Apr. 17, 2014

(30) Foreign Application Priority Data

Oct. 8, 2012  (FR) ...................... 12 59537

(51) Int. Cl.
*C02F 3/28*  (2006.01)
*C02F 3/34*  (2006.01)

(52) U.S. Cl.
CPC ............. *C02F 3/2866* (2013.01); *C02F 3/28* (2013.01); *C02F 3/342* (2013.01); *Y02W 10/12* (2015.05)

(58) Field of Classification Search
None
See application file for complete search history.

(56) References Cited

U.S. PATENT DOCUMENTS

| | | | |
|---|---|---|---|
| 2002/0139747 A1* | 10/2002 | Gantzer ..................... | 210/605 |
| 2007/0131614 A1* | 6/2007 | Knappe et al. ............ | 210/636 |
| 2009/0159533 A1* | 6/2009 | Lee et al. .................. | 210/695 |
| 2011/0094974 A1* | 4/2011 | Katakura et al. .......... | 210/797 |

* cited by examiner

*Primary Examiner* — Chester Barry
(74) *Attorney, Agent, or Firm* — Coats and Bennett PLLC

(57) ABSTRACT

The invention pertains to a method for continuous treatment of water. According to the invention, such a method comprises a step of biological treatment of water followed by a step of filtration, characterized in that it comprises a step of enzymatic treatment planned between said step of biological treatment and said step of filtration, said step of enzymatic treatment being carried out by enzymes fixed on at least one three-dimensional support, said enzymes being capable of degrading at least a part of the organic matter contained in the water coming from said step of biological treatment.

19 Claims, 4 Drawing Sheets

US 9,249,037 B2

METHOD FOR CONTINUOUS TREATMENT OF WATER CONTAINING ORGANIC MATTER BY ENZYME TREATMENT

This application is a U.S. National Application based on French Patent Application No. 1259537 filed 8 Oct. 2012. The subject matter of this application is incorporated herein.

1. FIELD OF THE INVENTION

The field of the invention is that of the treatment of water. More specifically, the invention pertains to a method for treating water that implements a step for the biological treatment of water followed by a filtration. The invention finds application in the treatment of urban and industrial wastewater in order to purify it.

2. PRIOR ART

Methods for treating water that implement a step of biological treatment lead to the formation of aggregates formed by microorganisms, organic matter, and mineral matter commonly called "flocs". One solution for eliminating these flocs is to filter the biologically treated water on membranes or screens. However, a relatively rapid clogging is often observed in the filtration membranes or in the screens. This means having to carry out frequent unclogging operations. These regular unclogging operations are detrimental to the overall economy of these methods.

The clogging of membranes or screens results especially in the presence of organic matter in the form of organic compounds excluding biomass, such as colloids, exopolysaccharides or organic fractions. These soluble organic compounds are not degraded by the biomass. Their presence is expressed in chemical oxygen demand (COD). This COD greatly and quickly limits the performance of the filtering units. The consequence of this is to greatly limit the volume loading (Cv) of the apparatuses associated thereto. For example, the volume loading applied to an anaerobic membrane bioreactor, more commonly known as an AnMBR, is limited to 6-8 kg/m$^3$/day of COD. By way of a comparison, the volume loading applied to a known biogas producing methanization reactor such as the expanded granular sludge bed (EGSB) is between 20 and 24 kg/m$^3$/day of COD, i.e. about three times the treatment capacity of an AnMBR. Thus, to treat water charged with organic matter, the volume of an AnMBR needs to be three times that of an EGSB. This comparison fully illustrates to which the construction and operation of water treatment plants this problem of filtration membrane clogging when the volume loading increases.

In practice, the membrane flow of the membranes used to treat water charged with organic matter is quite obviously lower than the membrane flow of the same membranes for the treatment of clear water. Thus, this flow is three to four times lower for the treatment of sludge coming from an anaerobic method and five to ten times lower for treatments of sludge coming from an anaerobic method. The membrane surfaces therefore have to be all the greater for identical flow rates.

Furthermore, the maximum biomass concentration in biological reactors is limited and does not provide for optimum performance owing to the great load per unit of mass applied (kg of COD to kg of biomass in suspension/day).

Finally, the depositing of organic matter on the surface of the membranes fosters the development of a biofilm on the surface of the filtering membranes, accelerating their wear and tear and their clogging.

In order to resolve these problems, there are methods for the cleaning in place (CIP) of membranes or screens dedicated to the retention of the organic matter contained in water. In this type of cleaning, a solution formed by chemical additives and/or enzymes is made to circulate on the membranes or screens. This solution degrades the biofilms and non-biomass substances that could clog the membranes. However, this method cannot be applied continuously and therefore calls for a complete stoppage of the entire water filtering line. Furthermore, the enzyme-based solutions used for the cleaning are extremely costly and enable only coarse and temporary unclogging of the membranes. Finally, the techniques for cleaning in place by circulation of an enzyme solution do not enable the retrieval of the enzymes once these are used. The enzymes are therefore lost after only one use, which is a very costly waste.

It has also been observed that the increase in the frequency of such cleaning in place does not significantly improve the results and only unnecessarily increases operating costs.

It has also been proposed in the prior art to fix the enzymes directly on the membranes. However, it has been observed that this mode of fixing can lower the original performance of the membranes. Furthermore, the membranes on which the enzymes are fixed must be changed as soon as the enzyme activity diminishes. This must be done in order to maintain optimum treatment efficiency. However, these membranes are still capable of filtering the water that reaches them. Given the cost of these membranes, these frequent changes induce unnecessary waste and a very major increase in cost.

It will be noted however that there has already been a method of biological treatment proposed in the prior art enabling a reduction in the concentration of soluble organic compounds upstream to the filtering membranes. This technique, described in the patent application WO 2011/026521, does not implement any step of enzymatic treatment. This technique proposes the use of a biological reactor provided upstream to membranes integrating three-dimensional supports for the fixing and growth of microorganisms capable of at least degrading soluble organic compounds in order to limit the clogging of the membranes. The present invention is an alternative to this technique.

3. GOALS OF THE INVENTION

The invention is aimed especially at overcoming the drawbacks of the prior art described here above.

More specifically, it is a goal of the invention, in at least one embodiment, to provide a method for the biological treatment of water comprising a step of biological treatment and a subsequent step of filtration enabling a reduction in the quantity of COD contained in the water reaching the filtering unit for the purposes of preventing or at the very least slowing down its clogging.

It is also a goal of the invention, in at least one embodiment, to implement a method for treating water that reduces the operating costs of the plant that implements it.

It is also a goal of the invention, in at least one embodiment, to provide a method for treating water that diminishes the size of the apparatuses of such a plant.

4. SUMMARY OF THE INVENTION

These goals as well as others that shall appear here below are attained by means of a method for continuous treatment of water, comprising a step of biological treatment of water followed by a step of filtration. According to the invention, such a method comprises a step of enzymatic treatment planned between said step of biological treatment and said step of filtration, said step of enzymatic treatment being carried out by enzymes fixed on at least one three-dimensional support, said enzymes being capable of degrading at least a part of the organic matter contained in the water coming from said step of biological treatment.

Thus, the invention relies on a wholly original approach in which, between a step of biological treatment and a step of filtration, a step of enzymatic treatment is introduced wherein the enzymes are fixed to a support. Thus, the organic matter contained in the water not eliminated by the biological treatment step is degraded by the enzymes. This step of enzymatic treatment of macromolecules such as exopolysaccharides therefore limits the clogging of the membranes by producing smaller fragments. Since the filtering stream is thereby increased, it is possible to significantly modify the parameters of sizing of the plants for treating water: the volume loading of the plant is thereby increased, the total filtering surface area is diminished and the service life of the membranes or screens is increased. This characteristic therefore diminishes the size of the apparatuses needed for the biological treatment of the water containing organic matter and therefore makes for economies of scale in the built-up structures and their maintenance. Besides, this also further enhances the performance of the process line for the biological treatment of water.

In addition, the fixing of the enzymes to a support enables the reutilization of the enzymes until they are exhausted. This is not the case when carrying out cleaning in place. This characteristic especially enables the use of smaller quantities of enzymes for the same result, as compared with the injection of enzyme solutions. Besides, the fixed enzymes are more resistant to the denaturation due to variations in pH, variations in temperature, the presence of heavy metals and fatty acids, etc. Their greater service life therefore reduces the frequency of maintenance of the plants, reduces the frequency of renewal of the enzymes and therefore considerably reduces the costs of operation of a plant for treating water.

Besides, the fixing of the enzymes facilitates their renewal: it is enough to recover the supports and replace them with supports on which fresh enzymes have been immobilized. The maintenance of an enzyme reactor according to the invention is therefore greatly facilitated.

Finally, this method enables the treatment of both liquid water and water more highly charged in suspended matter (SM) of urban and industrial origin, up to concentrations proper to sludge (40-80 g SM/L).

According to a preferred embodiment of the invention, the step of biological treatment is anaerobic. Indeed, during the biological treatment of wastewater, the suspended matter and the biomass tend to aggregate and form flocs. When the biological treatment step is done in aerobic conditions, the flocs are bigger and easier to eliminate by mechanical means. On the contrary, flocs formed during a step of anaerobic treatment are smaller and more difficult to recover and eliminate physically. The clogging of the membranes is therefore a more recurrent problem and a greater inconvenience when the method for treating water implements anaerobic steps. The method according to the invention can be preferably applied to methods for treating water that implement a step of biological anaerobic treatment because it degrades these flocs and lastingly resolves the problem of membrane clogging.

According to a first variant of the invention, said step of enzymatic treatment follows said step of biological treatment and precedes said step of filtering. According to this variant, the biologically treated water first of all undergoes a step of enzymatic treatment before reaching the filtering unit. Thus, the water reaching the filtering unit is less concentrated in colloids and particles capable of clogging the filters. This water is therefore easier to filter and the filters of the filtering unit get clogged less rapidly.

In a second variant of the invention, said step of enzymatic treatment follows said step of filtration and precedes said step of biological treatment. In this case, the step of enzymatic treatment is implemented in a loop for recirculating at least a part of the water filtered by the filtering unit towards the step of biological treatment. The implementing of the enzymatic treatment at this level of the method makes it possible to obtain water rid of its organic components capable of clogging the filtering unit at the biological treatment step. Consequently, the water to be filtered has been treated in a biologically and enzymatically: it is therefore easier to filter.

It is possible in both variants to re-circulate at least a part of the water filtered towards the biological treatment step, thus diluting the sludge contained in the biological reactor. More specifically, the quantity of water to be made to re-circulate from the filtering unit to the biological reactor depends on the measurement of the pressure or the flow rate of the water at the filtering unit. Indeed, high pressure at the membranes or screens signifies that the water reaching the filtering unit is highly charged with particles capable of clogging the membranes or that the clogging process has begun. It will therefore be necessary to implement the step of enzymatic treatment in order to diminish this concentration in soluble compounds and facilitate the filtering.

Advantageously, said step of filtration implements means of filtration having a cut-off capacity of 0.01 µm to 1 mm and are chosen from among membranes, drums, filter discs and granular filters.

Advantageously, the at least one three-dimensional support is chosen from among clay beads, expanded polystyrene beads, polyurethane foams, polyurethane membranes, elements made of plastics such as polyurethane, polyethylene or polypropylene, alumina fibers, glass fibers, Nylon® fabric, non-woven polyester, polystyrene pipes, hollow polystyrene beads, Raschig rings.

The choice of the support for fixing the enzymes depends on the characteristics of the enzymes to be fixed and the water to be treated and can be determined through the general knowledge of those skilled in the art. However, these supports have the advantage of being chemically inert. This prevents interference with the enzymes. These supports are also light, easy to produce and cost little. Furthermore, they offer a substantial fixing surface for the enzymes, thus greatly improving the efficiency of the enzymatic treatment step as provided for in the invention.

In a particularly advantageous way, the percentage of voids in the enzyme-fixing support should be greater or equal to 98%. The percentage of voids is computed as follows:

Percentage of voids (%)=1−(volume of material constituting the volume support/total volume of the support).

Even more preferably, the surface area of contact of the support with the enzymes will range from 150 to 1500 $m^2/m^3$, and preferably from about 200 to 500 $m^2/m^3$. The contact surface area can be computed as follows:

Contact surface area ($m^2/m^3$)=maximum support surface area capable of being covered by the enzyme/overall volume of the support.

Preferably, said enzymes are fixed on the at least one support, either directly or by immobilization through a polymer.

The enzymes can be fixed directly to the support during the industrial manufacture of the support. This direct fixing can be done by adsorption of enzymes by the material of the support, for example the surface of expanded polystyrene beads, alumina fibers, foams and elements made of plastic such as polyethylene, polypropylene. This adsorption step can also be followed by a step of polymerization or a step of cross-linking. Finally, the direct immobilization can be done by covalent bonding of the enzymes with their fixing support, as can be the case with glass fibers, foams and elements made of plastic such as polyurethane, polyethylene and polypropylene, or Nylon® fabric.

The enzymes can also be fixed to the supports indirectly, through a polymer or a polymer resin, which is then applied to the support. The supports capable of being used for an indirect mode of fixing comprise especially alumina or glass fibers, non-woven polyester, Nylon fabric, hollow beads or tubes of polystyrene. Polymers capable of being implemented in the context of indirect immobilization of the enzymes on the support can especially be chosen from among the following: polyethylene-imine, polyazetidine, polyphenylalanine-lysine, olefinic polyether and polysulfone.

The enzymes could be fixed to the supports according to various known techniques of the prior art. This mode of fixing enzymes depends both on the nature of the enzyme and that of the support (C. Z. Guidini et al, *Biochemical Engineering Journal*, 52 (2010), 137-143).

In one advantageous embodiment, the time of contact of water with said enzymes during said step of enzymatic treatment is from 1 to 30 minutes, and is preferably equal to about 10 minutes. The contact time depends on the concentration in enzymes and the concentration in organic compounds to be degraded present in the water as well as the physical/chemical conditions of the medium (pH and temperature). A short contact time suffices for the enzymes to degrade the molecules of organic matter contained in the water after biological treatment. It also makes it possible not to slow down the method. Slowing down the method would increase the cost of treatment of the water.

In a preferred embodiment, the method according to the invention further comprises a step of recirculation of at least one part of the water coming from said step of filtration towards said step of biological treatment. This step of recirculation improves the quality of the treated water.

Preferably, said enzymes are chosen from among the lipases, proteases, amylases, glycogenases, cellulases, glucosidases and their combination. The enzymes are chosen according to the nature of the water to be treated and their choice can be determined through the general knowledge of those skilled in the art. Examples of such enzymes are lipase, trypsin, chymotrypsin, pepsin A, AC lyase, hyaluronidase, alpha-m-annostiase, alpha-D-glucostiase, beta-D-glucostiase, alpha-D-galactostiase, staltiase, lysozyme, pectinase, chithinase, D-extranase, amyloglucostiase, beta-amylase, alpha-amylase and glycogenase.

Advantageously, the method according to the invention further comprises a step for cleaning in place said means of filtration. In this case, the composition of the cleaning solution will be limited preferably to chemical additives for sterilizing equipment for example. Such cleaning in place could be implemented far less frequently than in plants that do not implement enzymatic treatment according to the present invention.

Another aspect of the invention pertains to a plant for treating water containing organic matter for implementing the method according to the invention comprising:
a. means for leading in the water containing organic matter to be treated,
b. a reactor for the biological treatment of the water,
c. at least one filtration unit including filtration means,
d. means for discharging the filtered water, characterized in that said plant further comprises an enzymatic treatment reactor enclosing at least one three-dimensional support on which enzymes are fixed.

The interposing of the enzymatic reactor between the biological reactor and the filtering unit enables the filtering membranes and screens to be put into contact with only biologically treated water containing only small fragments of soluble organic compounds. This characteristic makes it possible not to saturate membranes with a flow is too compact to be filtered.

Preferably, the geometry of the enzymatic reactor complies with the height/diameter ratio equal to about 2 to ensure an upflow sufficient to limit the clogging for a lower energy cost.

Advantageously, said enzymatic treatment reactor is provided with means to isolate it hydraulically. These hydraulic isolation means can include pipes for leading in biologically treated between the biological reactor and the enzymatic reactor as well as pipes for removing water treated by the enzymes between the enzymatic reactor and the filtering unit. These two types of pipes can be controlled by valves in order to enable the circulation of water in the enzymatic reactor or block such circulation. The hydraulic isolation therefore corresponds to the state of the reactor when the valves of the inlet and/or discharge pipes are closed. In this case, the plant according to the invention furthermore comprises direct means of fluid communication of the biological treatment reactor with at least filtering unit. These direct means of fluid communication do not work at the same time as the enzymatic reactor. Thus, it is possible to close the circulation of the water between the biological treatment reactor and the enzymatic treatment reactor to divert the biologically treated water towards the direct means. The water will therefore circulate between the biological treatment reactor and the filtering unit as is the case in the prior-art plants. This characteristic makes it possible to take action on the enzymatic reactor in case of malfunction or for maintenance, without requiring the complete stopping of the method for treating water.

Furthermore, this characteristic also makes it possible to adapt and recycle present-day plants because it is enough to install the reactor and to put it into communication with the biological reactor and the existing filtering unit to be able to implement the method according to the invention. This aspect of the invention therefore limits costs related to the conversion of the plant and improves the performance of present-day plants for lower cost.

Advantageously, said biological treatment reactor includes mechanical, hydraulic or gas-based mixing means. Such mixing means promote the degradation of the matter contained in the water to be treated by the biomass.

In one preferred embodiment of the invention, said biological treatment reactor is chosen from the group comprising a completely stirred tank reactor or CSTR, a fluid bed reactor, a granular sludge bed reactor (for example the upflow granular sludge blanket) and hybrid reactors.

Examples of granular sludge blanket reactors that can be cited are the upflow anaerobic sludge blanket (UASB) or the EGSB. The term "hybrid reactor" is understood to mean a reactor combining several technologies, such as a reactor combining a biofilter and UASB technology.

Advantageously, said filtration means are chosen from among a microfiltration membrane, nanofiltration membrane, ultrafiltration membrane and reverse osmosis membrane.

Preferably, the plant according to the invention further comprises a cleaning-in-place tank and means for connecting said tank to the at least one filtration unit and to the biological treatment reactor. The technique for cleaning in place can be used as a complement to the method according to the invention for intensively cleaning all the apparatuses constituting the plants. In this case, the cleaning solution will comprise mainly chemical additives, the enzymatic treatment of the pollutants being done continuously through the method of the invention.

In one advantageous embodiment, the plant according to the invention further comprises a loop for recirculation of the treated and filtered water towards the biological treatment reactor and/or a loop for recirculation of the water treated by the enzymatic reactor towards the biological reactor. This characteristic especially dilutes water, which might be excessively charged with organic material, excluding biomass, in order to facilitate its treatment and improve the quality of the treated and filtered water.

In a first variant of the invention, said enzymatic reactor is situated downstream from said filter unit and upstream to said biological reactor. In this embodiment, the biologically treated water is then rid of non-degradable organic compounds by the biomass through an enzymatic treatment step implemented in the enzymatic treatment reactor. The constituents contained in the water liable to clog the filters of the filtering unit are thus sufficiently degraded. The water is filtered more easily, the filters get clogged less rapidly and the frequency of maintenance and replacement of the filters is reduced.

In a second variant of the invention, said enzymatic reactor is situated downstream from said filtering unit and upstream to said biological reactor. This variant is particularly valuable when a recirculation loop is implemented between the filtering unit and the biological treatment reactor.

5. LIST OF FIGURES

Other features and advantages of the invention shall appear more clearly from the following description of a preferred embodiment, given by way of a simple illustrative and non-exhaustive example and from the appended figures, of which:

6. DESCRIPTION OF ONE EMBODIMENT OF THE INVENTION

Figure 1:
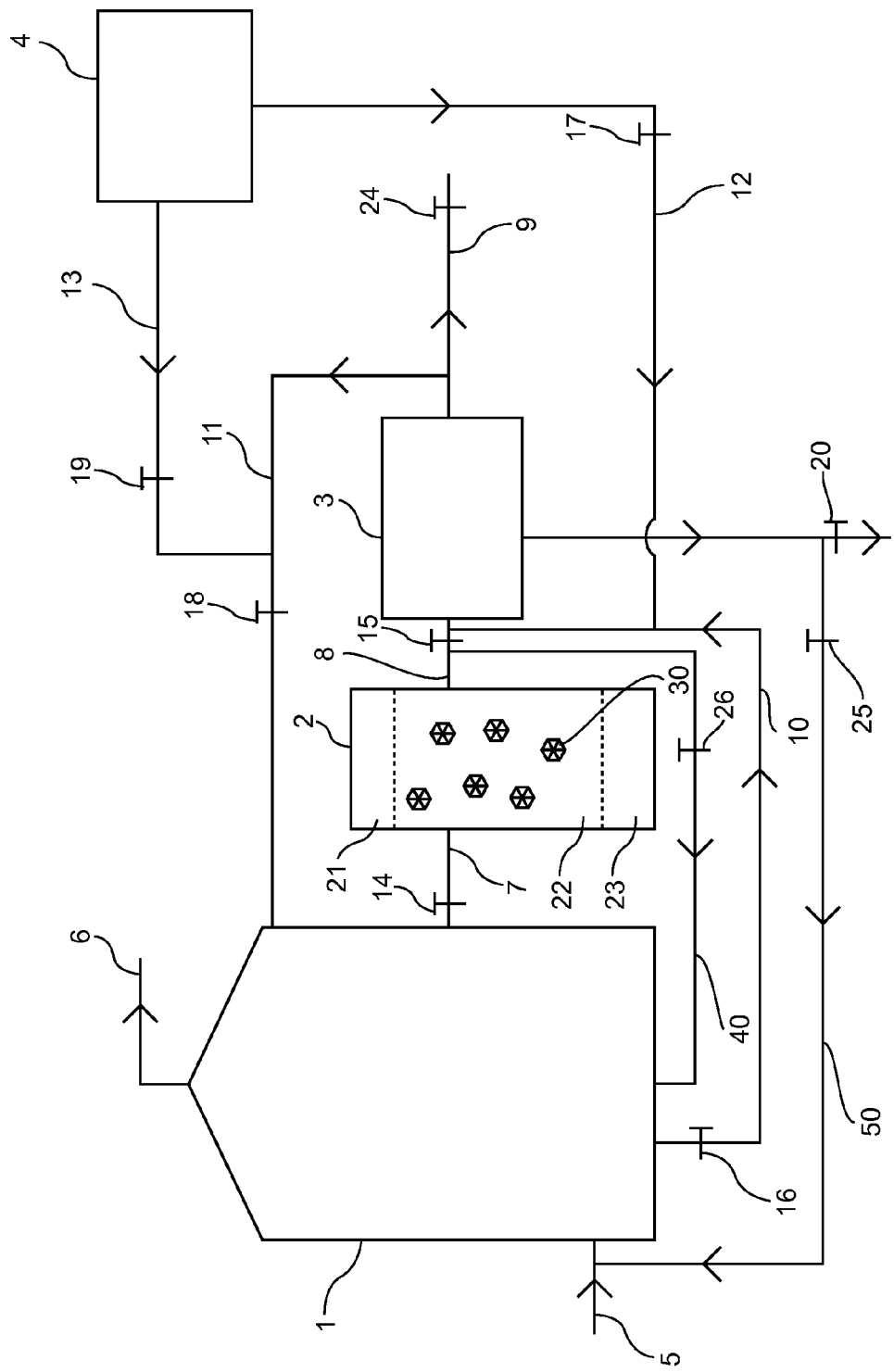
FIG. 1 is a block diagram of a first embodiment of a plant for implementing a method according to the invention.

The general principle of the invention relies on the enzyme degradation of organic compounds, non-degradable by biological treatment, that are contained in water to be treated and are responsible for the clogging of the filtration units used in methods for treating water. A first variant illustrating this principle consists of the interposing of a step of enzymatic treatment on supports between a step of biological treatment and a step of membrane filtration. In another variant also illustrating this principle, the step of enzymatic degradation is done on concentrates that are produced during the step of filtration and then redirected towards the biological reactor to undergo another step of biological treatment. Thus, the biologically treated water is already rid of a large part of its organic compounds before being treated biologically and reaching the filtration unit.

Indeed, subjecting biologically treated water to a step of enzymatic treatment on supports makes it possible to degrade these compounds into smaller-sized fragments and therefore to prevent or at any rate to restrict the clogging of the membranes. The fixing of the enzymes to a support furthermore enables their extended use in time, limiting the frequency of maintenance operations and the operating costs of the plant.

6.1. Example of a First Embodiment of a Plant for Implementing the Method According to the Invention Referring to FIG. 1, we present the block diagram of an example of a plant for the treatment of an effluent containing organic matter by means of the method according to the invention.

The water to be treated is conveyed by the pipe 5 for leading in water and then subjected to a step of biological treatment in an anaerobic reactor 1. This reactor 1 contains biomass used to degrade a part of the pollution contained in the water. The biogas is discharged to the top of the reactor 1 by a pipe 6 for discharging biogas. This reactor 1 is of the anaerobic CSTR type with stirrer.

The biologically treated water is conveyed from the biological reactor 1 to the enzymatic reactor 2 by a pipe 7. The enzymatic reactor 2 has a generally cylindrical shape with a height/diameter ratio approximately equal to 2.

Figure 3:
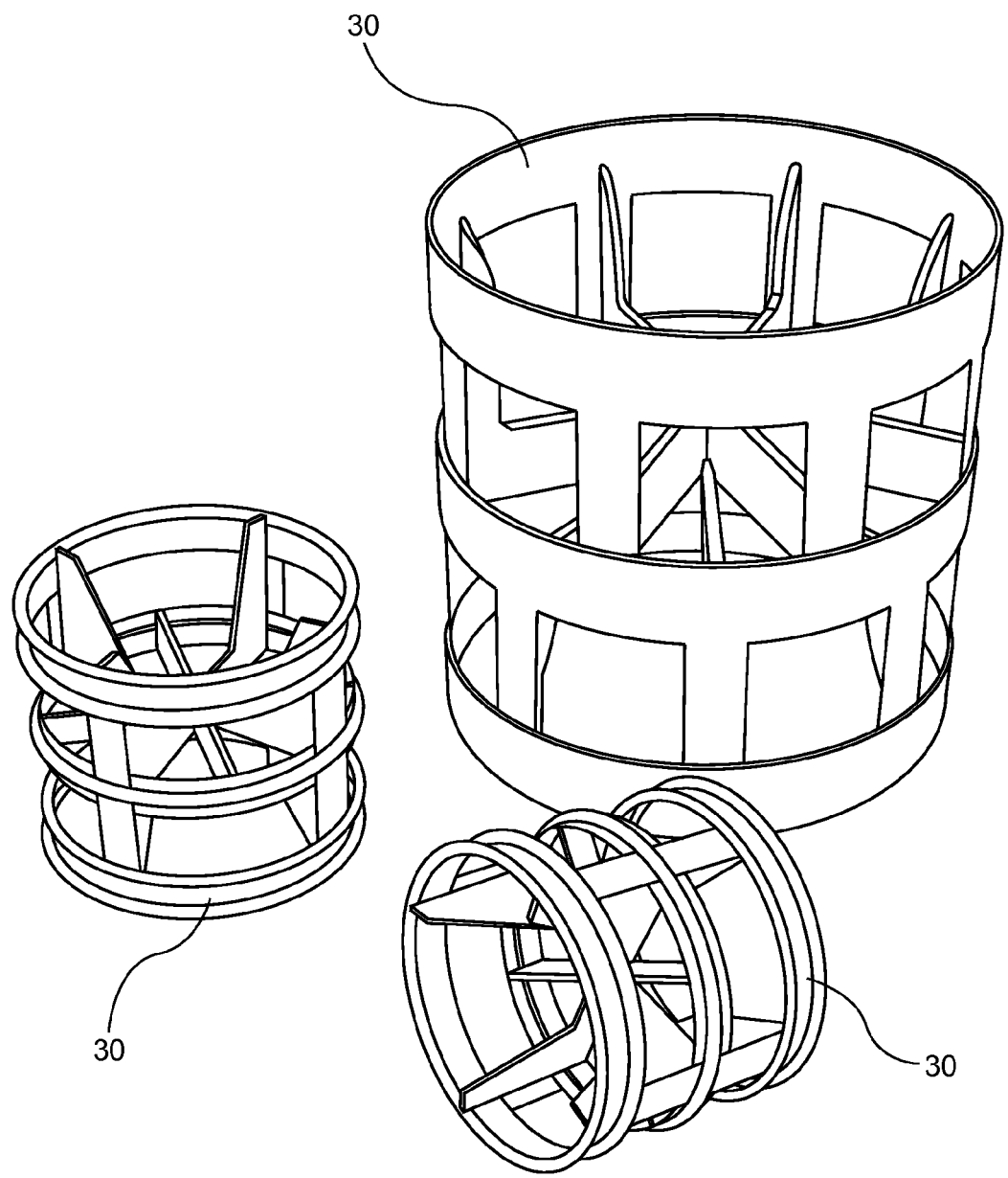
FIG. 3 is an example of a three-dimensional support that can receive enzymes within the framework of an embodiment of the present invention.

The enzymatic reactor 2, having an upflow or downflow, has a floor 23 and a ceiling 21 which are perforated. It is filled in its median part 2 with three-dimensional supports 30 made out of a chemically inert material on which enzymes are immobilized. An example of three-dimensional supports 30 made out of polyethylene or polypropylene is shown in FIG. 3 in different sizes. Such supports 30 comprise a percentage of voids of at least 98% and a surface area of contact with the enzymes of about 200 $m^2/m^3$. Examples that could be cited are the fixing of lipase, glucosidases and proteases fixed by adsorption on expanded polystyrene beads. The biologically treated water remains in contact with the enzymes fixed to the support 30 for an approximate duration of 10 minutes. During this time, the enzymes act on the flocs of organic matter to decompose the organic macromolecules into smaller-sized fragments. For example, the molecules of starch are digested by the amylases into glucose decamers. The desired size of the fragments is determined according to the porosity of the membranes used and can be obtained by increasing the time of contact with water and enzymes, by increasing the enzyme concentration in the enzymatic reactor 2 or diversifying the enzymes to multiply the possibilities of degradation.

The water treated in the enzymatic reactor is then discharged by a pipe 8 to the membrane filtration unit 3. The membrane filtration of water is also done in an anaerobic medium on membranes, for example of the X-flow F-4385 type by NORIT®. The water thus filtered is discharged by a pipe 9 for discharging filtered water.

A recirculation loop 11 is used to send a part of the filtered water to the biological reactor 1. This characteristic makes it possible especially to dilute the water to be treated, which would be exceptionally charged with organic matter.

A pipe 40 is used to make the organic matter degraded by the enzymes in the reactor 2 circulate to the biological reactor 1. The concentrate coming from the filtration unit 3 is recirculated by means of the pipe 50 to the pipe 5 for leading in water to be treated so that the concentration in the reactor is constant. This is done by the one-time opening of the valve 25. The concentrate is discharged by opening the valve 20. This configuration is chosen if it is realized that the polymers during the passage in the reactor 2 pass through the membranes of the reactor 3. In this case, it is preferably to make the small-sized colloids re-circulate so that they are digested by the biomass of the biological reactor 1 and do not pass through the filtration unit 3.

A pipe 10 is used to make the digestate formed by flocs and liquid circulate directly from the biological reactor 1 to the filtration unit 3 in the event of maintenance action on the enzymatic reactor 2.

It must also be noted that the pipes 7, 8, 9, 10, 11, 40 and 50 are respectively provided with remote-controllable valves 14, 15, 24, 16, 18, 26, 25, enabling the sense of circulation between the different apparatuses 1, 2 and 3 to be controlled.

In this embodiment, a cleaning-in-place reactor 4 is also planned for the regular cleaning of all the apparatuses. This reactor 4 is connected respectively to pipes 10 and 11 by pipes 12 and 13, the operation of which is respectively controlled by the valves 17 and 19. The pipes 12 and 13 enable the circulation of a cleaning solution containing chemical products ($H_2O_2$, NaOH, nitric acid, phosphoric acid, etc) throughout the plant. Since the enzyme degradation of the organic compounds contained in the water is implemented continuously through the method of the invention, the cleaning in place can be done far less frequently than in prior-art plants.

The working of the plant for implementing the method according to the invention is explained in greater detail by means of the table 1. Three different modes of operation are summarized therein and the valves are handled (manually or automatically) according to these three modes:
- the operation of the plant when the method of the invention is implemented or "normal mode";
- the operation of the plant when it is cleaned by the CIP technique; and
- the operation of the plant when the enzymatic reactor 2 is under maintenance.

TABLE 1

Functional table of opening/closing of valves according to the different modes of operation of the method according to the invention

| | Valve number | | | | | | | | |
|---|---|---|---|---|---|---|---|---|---|
| | 14 | 15 | 16 | 17 | 18 | 19 | 20 | 24 | 25 | 26 |
| Normal mode | O | O | O/C | C | O/C | C | O/C | O | O/C | O/C |
| Cleaning with CIP | C | C | C | O | C | O | O/C | C | C | C |
| Maintenance of the reactor | C | C | O | C | O/C | C | O/C | O | O/C | C |

Legend of table 1:
"O" means that the valve is open,
"C" means that the valve is closed, and
"O/C" means that the valve is temporarily open, depending on the controls applied.

More specifically, in normal mode, the enzymatic reactor 2 works continuously. The valves 14 and 15 are therefore open so that the flow goes from the biological reactor 1 to the enzymatic reactor 2 and then from the enzymatic reactor 2 to the filtration unit 3. In a first option, the reactor 2 feeds the filtration unit 3: the valve 15 is open, the valves 16 and 26 are closed. In this case, the enzymatic treatment increases the membrane flow by retaining the degraded colloids by the enzymes. In a second option, the reactor 2 feeds the biological reactor 1 by recirculating digestate to the biological reactor: the valve 15 is closed, the valves 16 and 26 are open. In this case, the enzymatic treatment makes the degraded colloids more easily digestible by the reactor 1 before the effluents are sent to the filtration unit 3. The valves 17 and 19 are closed because CIP is not used. The valve 18 can be closed or opened according to the rate of recirculation of effluent that may be needed for diluting digestates. The valves 20 and 25 are open or closed according to the rate of anaerobic sludge to be maintained or extracted from the reactor 1. The valve 24 is opened to discharge the filtered water towards the output.

When the plant is cleaned by the CIP technique, the enzymatic reactor is at a stop and therefore the valves 14, 15, 16 and 26 are closed. The valves 17 and 19 are opened so that the solution contained in the reactor 4 can circulate in the plant according to the invention. The valves 18, 20, 24 and 25 are closed.

When the enzymatic reactor 2 is undergoing maintenance, the enzymatic reactor 3 is stopped and isolated and therefore the valves 14, 15 and 26 are closed. The valve 16 is opened to bypass the reactor 2 and enable continuous working of the biological reactor 1 without the enzymatic reactor 2. The valves 17 and 19 are closed because the CIP is not used. The valve 18 can be closed or opened depending on the rate of recirculation of effluent that may be needed for the dilution of the digestates. The valves 20 and 25 are opened or closed depending on the rate of anaerobic sludge to be kept in or removed from the reactor 1. The valve 24 is opened to discharge the filtered water towards the output. The isolation of the enzymatic reactor 2 hydraulically enables the enzymatic reactor to be integrated into the pre-existing plant at lower cost. To this end, it is sufficient to install the reactor and make it communicate in a fluidic manner with the biological reactor 1 and the filtration unit 3. More specifically, the valves 18, 20 and 25 enable the regulation of the mass load, expressed in COD kg to be processed/kgMVj, within the reactor 1. If it is sought to increase the concentration of sludge in the reactor 1, and therefore to diminish the mass loading, it is enough to open the valve 25 in order to send back the concentrates coming from the filtration unit 3 to the reactor 1. In this case, the valves 20 and 18 are closed so as not to extract sludge or dilute digestate by filtered water. If, on the contrary, it is desired to dilute the sludge and therefore increase the mass loading, it is necessary to close the valve 25 and open the valves 18 and 20.

This characteristic therefore converts and improves an existing plant simply, speedily and economically. This embodiment of a plant according to the invention is also suited to the treatment of both municipal industrial effluents. It is also suitable for treating sludge.

6.2. Comparative Trial 1—Membrane Flow

Comparative trials were conducted in order to evaluate the gain in performance obtained through the method according to the invention for the treatment of different types of effluents. Four samples were treated either by the classic method or by the method according to the invention. The effluent used was lactoserum-rich industrial effluent from the dairy industry. This type of effluent is less rich in suspended solids.

The classic method comprises a step of anaerobic biological treatment followed directly by a step of filtration under anaerobic conditions on membranes.

The method of the invention comprises a step of anaerobic biological treatment followed by a step of enzymatic treatment and then a step of filtration under anaerobic conditions on membranes, as shown in FIG. 1. The steps of filtration and biological treatment are implemented in apparatuses strictly identical in both methods.

The plant according to the invention comprises a CSTR type biological reactor (continuous-stirred tank reactor) with a volume equal to about 2250 m$^3$. The enzymatic reactor is of a degassing tower type with a volume of 30 m$^3$ and has a height of 5.35 m, a diameter of 2.66 m, and a surface area of 5.6 m$^2$. The filtering unit has five modules of the X-Flow F-4385 (Norit) type. The supports used for the enzymatic step were finned rings with a diameter of 25 mm, made of polypropylene, on which proteases were fixed. The average hydraulic residence time in the enzymatic reactor was set at approximately 10 minutes. The anaerobic condition was chosen because, as specified here above, the flocs formed during a step of anaerobic biological treatment are finer and more difficult to eliminate than the flocs produced during an anaerobic step.

The performance of each method was evaluated by measuring filtration speeds in the filtering unit for each of the following conditions, as a function of the concentration of total suspended solids (TSS) in each of the effluents:
- condition 1: lactoserum-rich effluent treated with the conventional method in a critical situation (maximum flow before clogging);
- condition 2: lactoserum-rich effluent treated with the conventional method;
- condition 3: lactoserum-rich effluent treated with the method according to the invention.

Figure 2:
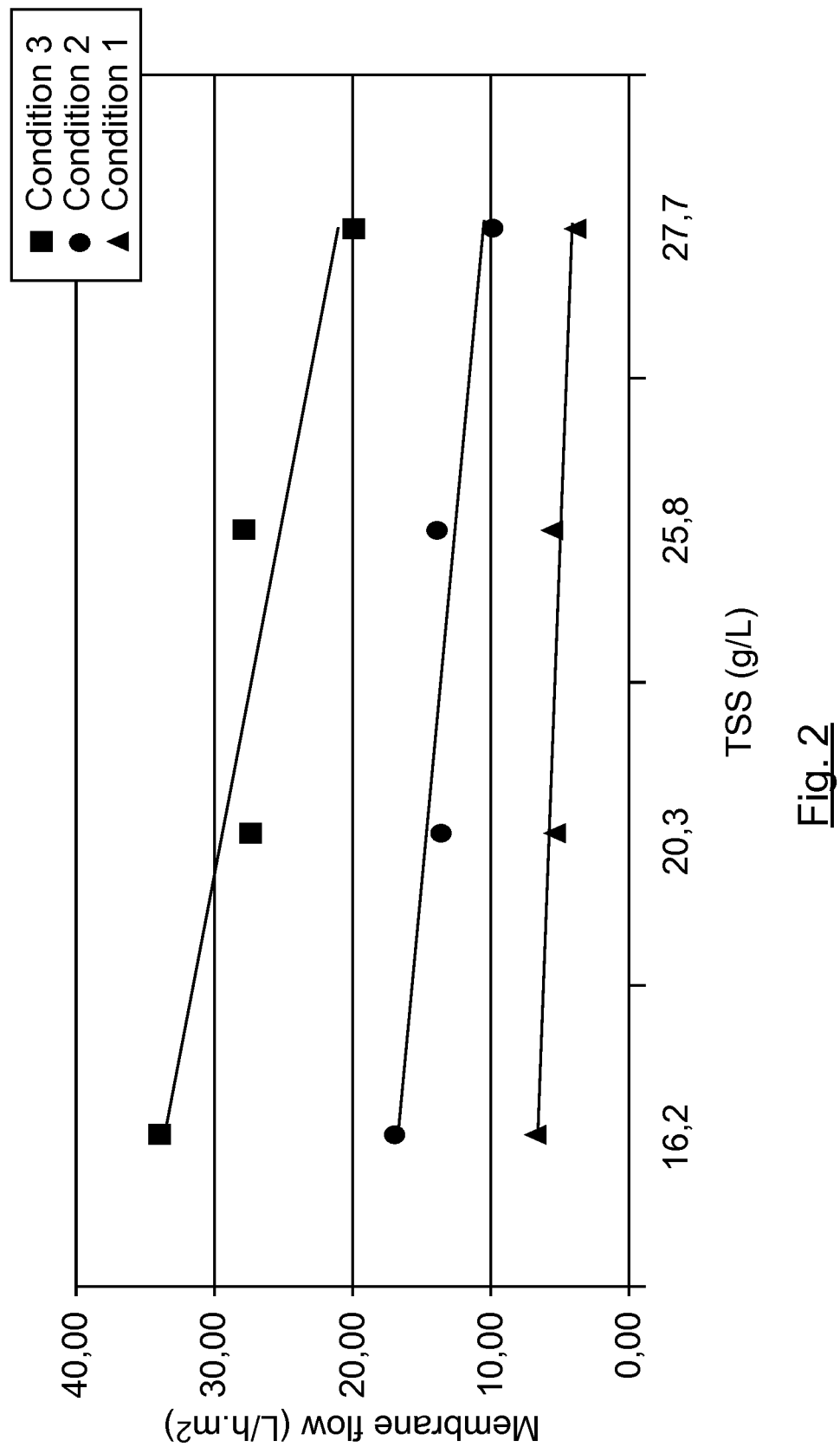
FIG. 2 is a graph of the results obtained by the implementing of the method according to the invention with a plant according to FIG. 1.

The results are presented in the graph of FIG. 2. As can be seen from this graph, the method of the invention doubles the membrane flow as compared with the condition 2, for the same technical characteristics and a same effluent. As compared with condition 1, the method according to the invention multiplies the filtration speeds by a factor of about 5.

Indeed, since the molecules of organic matter are degraded into smaller fragments, the pores of the membranes are thereby less clogged. Thus, the filtration speed is considerably increased.

6.3. Comparative Trial 2—Sizing the Plants

Different sizing trials were made to evaluate the impact of the introduction of an enzymatic step in the method for treating water on the size of the structures to be built.

The effluent used was lactoserum-rich effluent indicated under point 6.2 of the application. The steps of the conventional method and those of the invention were those indicated in point 6.2. The samples of this effluent were treated with either:
- the conventional method;
- the method according to the invention, in modifying the number of membrane filtering modules; or
- the method according to the invention in reducing the size of the volume of the biological reactor.

The goal of this test is to determine the extent to which savings in built-up structures can go to fix a flow rate of treatment of water equal to 170 m³/hour.

6.4 Example of a Second Embodiment of a Plant for Implementing the Method According to the Invention.

Figure 4:
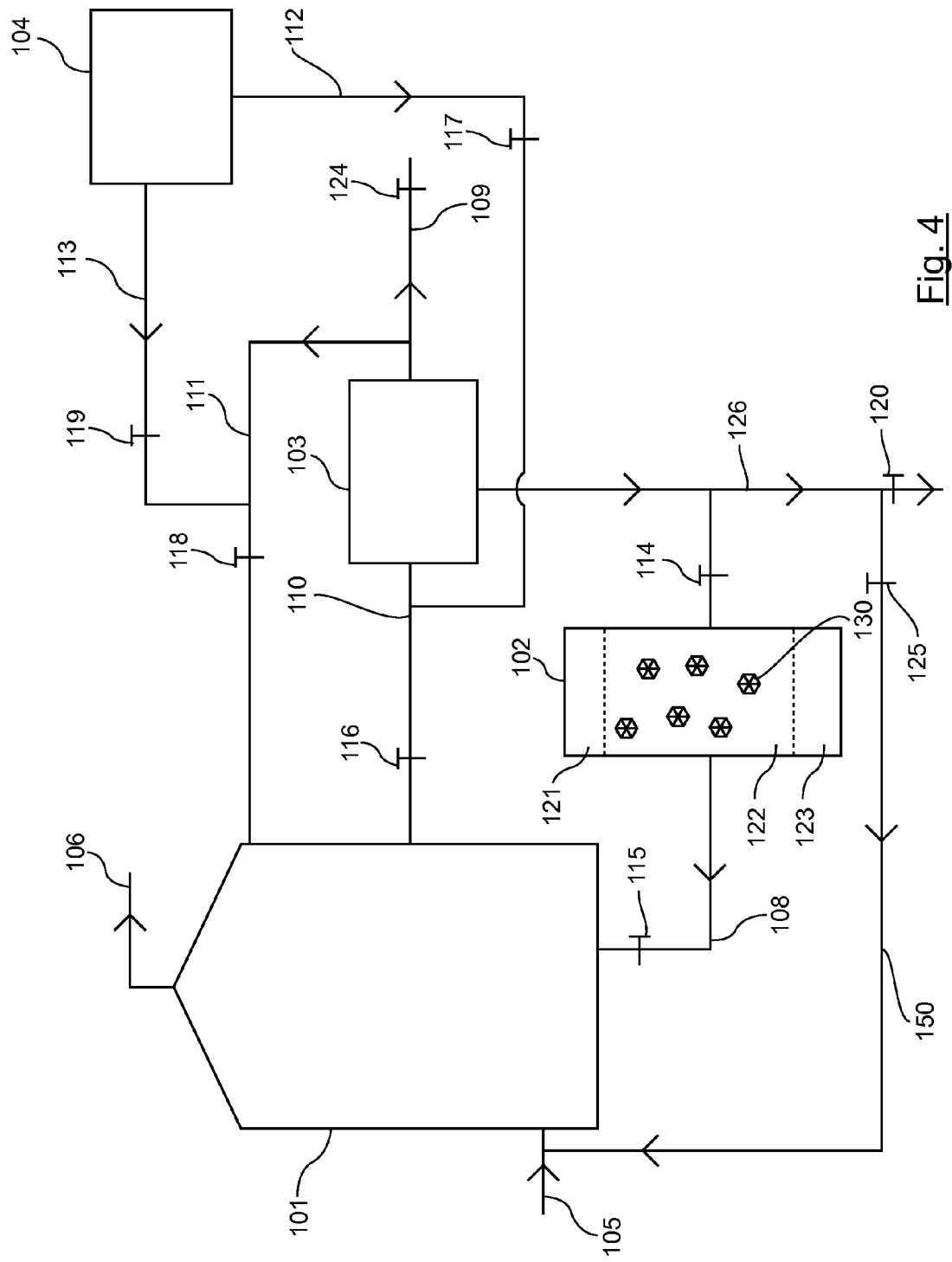
FIG. 4 is a block diagram of a second embodiment of a plant for implementing the method according to the invention.

A second variant of the method according to the invention is implemented in the plant shown in FIG. 4. The apparatuses constituting this embodiment of the invention are identical in every way with those explained under point 6.1. Briefly, the water to be treated is conveyed by the pipe for leading in water 105 to be subjected to a biological treatment step in an anaerobic CSTR type reactor 101 with stirrer. This reactor 101 contains biomass enabling a part of the pollution contained in the water to be degraded. The biogas is discharged towards the top of the reactor 101 by a biogas discharge pipe 106.

The biologically treated water is conveyed from the biological reactor 101 to the filtration unit 103 via a pipe 110 whose opening and closing are controlled by the valve 116. Once filtered, the water is discharged by the pipe 109 also controlled by the valve 124. A part of this filtered water can be recirculated to the reactor 101 via the pipe 11 and the valve 118 in order to dilute the excessively concentrated water to be treated for example. The concentrate constituted by the wastes coming from the filtration are conveyed via the pipe 126 towards an enzymatic treatment reactor 102, identical with that described in the first embodiment: the reactor 102 has a generally cylindrical shape with a height/diameter ratio approximately equal to 2. It also has an upflow or downflow, a floor 123 and a ceiling 121 that are perforated. It is filled in its median part 122 with three-dimensional supports 130 made out of a chemically inert material on which the enzymes are immobilized. These supports 130 are identical to the supports 30.

The concentrate remains in contact with the enzymes fixed to the supports 130 for an approximate duration of 10 minutes during which the enzymes act on the flocs of organic matter to decompose the organic macromolecules into smaller-sized fragments.

The concentrate treated in the enzymatic reactor 102 is then discharged by a pipe 108 to the biological reactor 101. The excess concentrate is discharged by the pipe 126 controlled by the valve 120. Finally, there is a recirculation loop 150 enabling the concentrates to be sent on directly to the biological treatment step.

TABLE 2

Results of trials of sizing of a plant according to the invention, compared with a presently used plant

|  | Present-day plant | Plant according to the invention - sizing 1 | Plant according to the invention - sizing 2 |
| --- | --- | --- | --- |
| Volume of anaerobic biological reactor | 2250 m³ | 2250 m³ | 1125 m³ |
| Volume of enzymatic reactor | 0 m³ | 30 m³ | 30 m³ |
| Speed of passage of flow into the enzymatic reactor | 0 | 30 m/h | 30 m/h |
| Geometry of the enzymatic reactor | 0 | Surface area: 5.6 m² Diameter: 2.66 m Height: 5.35 m | Surface area: 5.6 m² Diameter: 2.66 m Height: 5.35 m |
| Membrane surface area | 2 × 5 X-Flow F-4385 (Norit) modules | 1 × 5 X-Flow F-4385 (Norit) modules | 2 × 5 X-Flow F-4385 (Norit) modules |

As indicated in table 1, the method of the invention makes it possible, as compared with the conventional method, to halve either the membrane surface to be implemented or the volume of the biological reactor.

In this embodiment, a cleaning-in-place reactor 104 is also planned for the regular cleaning of all the apparatuses. This reactor 104 is connected respectively to the pipes 110 and 111 by pipes 112 and 113, the operation of which is respectively controlled by the valves 117 and 119. The pipes 112 and 113 enable the circulation of a cleaning solution containing chemical products ($H_2O_2$, NaOH, nitric acid, phosphoric acid, etc) throughout the plant. Since the enzyme degradation of the organic compounds contained in the water is implemented continuously through the method of the invention, the cleaning in place can be done far more rarely than in prior-art plants.

The working of the plant for implementing the method according to the invention is explained in greater detail by means of the table 3. Three different modes of operation are summarized therein and the valves are handled (manually or automatically) according to these three modes:

- the operation of the plant when the method of the invention is implemented or "normal mode";
- the operation of the plant when it is cleaned by the CIP technique; and
- the operation of the plant when the enzymatic reactor 2 is under maintenance.

TABLE 3

Functional table of opening/closing of valves according to the different modes of operation of the method according to the invention

| | Valve number | | | | | | | | |
|---|---|---|---|---|---|---|---|---|---|
| | 114 | 115 | 116 | 117 | 118 | 119 | 120 | 124 | 125 |
| Normal mode | O | O | O | C | O/C | C | O/C | O | O/C |
| Cleaning with CIP | C | C | C | O | O | O | C | C | (O) |
| Maintenance of the reactor | C | C | O | C | O/C | C | O/C | O | O/C |

Legend of table 3:
"O" means that the valve is open,
"C" means that the valve is closed, and
"O/C" means that the valve is temporarily open, depending on the controls applied, these controls being identical to those explained under point 6.1 of the present description.

This embodiment therefore enables an existing plant to be converted and improved simply, speedily and economically. This embodiment of a plant according to the invention is suited to the treatment of both municipal industrial effluents. It is also suitable for treating sludge.

This alternative embodiment of the invention however offers the advantage of applying enzymatic treatment only to concentrate produced by the filtration of water by the filtration unit 103. Thus, since the effect of the reactor 102 is applied only to the concentrates, it is more focused on the organic substrates which have low biodegradability unlike in the first embodiment presented under point 6.1, in which the effect of the enzymatic reactor 2 is applied to the totality of the constituents of the digestate which have easy or difficult biodegradability. This variant of the invention therefore makes it possible to produce a digestate at output of the reactor 101 that is less charged with colloids, exopolysaccharides and organic compounds not digestible by the biomass. Thus, although the biological reactor 102 is placed downstream from the filtration unit 103 and upstream to the biological reactor 101 and not the reverse, this embodiment also enables the production of biologically treated water containing fewer organic constituents liable to clog the membranes.

7. CONCLUSION

In the light of the results obtained according to the comparative trials described under points 6.2 and 6.3, it can clearly be seen that the method of the invention reduces the size of the plants to be implemented and therefore brings about major savings in the built-up structures.

Besides, through the implementation of the enzymatic treatment step, the water reaching the membranes contains smaller fragments and is therefore easier to filter. This characteristic therefore significantly increases the filtration speed at the level of the membranes. Now, the speed of filtration was hitherto one of the parameters limiting the sizing and efficiency of methods for treating water. The method according to the invention therefore improves and multiplies the efficiency of the plants for treating water.

Furthermore, since the phenomenon of clogging of the membranes occurs less frequently and with a greater delay, the action for cleaning in place or replacing membranes are less frequent. The method of the invention therefore also enables savings in the cost of the membrane filtration modules.

The invention claimed is:

1. Plant for treating water containing organic matter comprising:
   a. means for leading in the water containing organic matter to be treated,
   b. a reactor for the biological treatment of the water,
   c. at least one filtration unit,
   d. means for discharging filtered water, and
   characterized in that said plant further comprises an enzymatic treatment reactor enclosing at least one three-dimensional support on which enzymes are fixed and wherein said enzymatic treatment reactor is provided with means for enabling said enzymatic treatment reactor to be hydraulically isolated.

2. Plant according to claim 1 characterized in that said biological treatment reactor includes a mechanical, hydraulic or gas-based mixing means.

3. Plant according to claim 1 wherein said filtration unit is chosen from among a microfiltration membrane, nanofiltration membrane, ultrafiltration membrane and reverse osmosis membrane.

4. Plant according to claim 1 further comprising a cleaning-in-place tank and means for connecting said tank to the at least one filtration unit and to the biological treatment reactor.

5. Plant according to claim 1 further comprising a loop for recirculation of the treated and filtered water towards the biological treatment reactor and a loop for recirculation of the water treated by the enzymatic reactor towards the biological reactor.

6. Plant according to claim 1 wherein said enzyme reactor is situated downstream from said biological reactor and upstream to said filtration unit.

7. Plant according to claim 1 wherein said enzyme reactor is situated downstream from said filtration unit and upstream to said biological reactor.

8. Method of treating water, comprising:
  directing water to be treated into a biological reactor and biologically treating the water;
  after the water is biologically treated, directing the water, directly or indirectly, to a filtration unit and filtering the water to produce filtered water and a stream having filtered material;
  enzymatically treating the water prior to biologically treating the water or prior to filtering the water in the filtering unit;
  wherein enzymatically treating the water includes:
    (i) directing the water to an enzymatic reactor;
    (ii) supporting enzymes on a three-dimensional supports contained in the water in the enzymatic reactor; and
    (iii) enzymatically degrading organic matter contained in the water by contacting the water in the enzymatic reactor with the enzymes supported on the three-dimensional supports.

9. The method of claim 8 wherein the enzymatic reactor is disposed between the biological reactor and the filtering unit, and wherein the method includes first biologically treating the water and thereafter directing the biologically treated water into the enzymatic reactor, and after treatment in the enzymatic reactor, directing the water to the filtering unit.

10. The method of claim 8 wherein the method includes directing the stream having the filtered material from the filtering unit to the enzymatic reactor and treating the stream in the enzymatic reactor, and after treating the stream in the enzymatic reactor, directing the stream to the biological reactor.

11. The method of claim 9 wherein the filtering the water includes filtering the water with a membrane filtration unit and the method includes reducing clogging of the membrane filtration unit by enzymatically degrading the organic material in the water to form the organic material into smaller particles that pass through the membrane filtration unit without substantially clogging the same.

12. The method of claim 8 wherein the filtration unit comprises a membrane filtration unit that produces filtered water and a concentrated stream and the method includes directing at least a portion of the concentrated stream to the biological reactor and mixing the portion of the concentrated stream with the water.

13. The method of claim 8 including recirculating at least a portion of the water treated in the enzymatic reactor to the biological reactor.

14. The method of claim 9 including the step of directing a portion of the water treated in the biological reactor to a membrane filtration unit so as to bypass the enzymatic reactor disposed between the biological reactor and the membrane filtration unit.

15. The method of claim 8 wherein the enzymatic reactor is disposed in a sidestream and wherein the filtering unit is a membrane filtration unit that produces a filtered stream and a concentrated stream and wherein at least a portion of the concentrated stream is directed to the enzymatic reactor where organic material in the concentrated stream is degraded and after the concentrated stream has been subjected to treatment in the enzymatic reactor, directing at least a portion thereof to the biological reactor for biological treatment.

16. The method of claim 15 including splitting the concentrated stream produced by the membrane filtration unit into two streams and directing one stream into the enzymatic reactor and directing the other stream into the biological reactor.

17. The method of claim 8 wherein the time of contact of water with the enzymes is from 1 to 30 minutes.

18. The method of claim 8 wherein the enzymes are selected from the group of lipases, proteases, amylases, glycogenases, cellulases, glucosidases and their combination.

19. The method of claim 8 wherein the biological step is anaerobic.

* * * * *